(12) United States Patent  
Yamamoto et al.

(10) Patent No.: US 7,519,756 B2  
(45) Date of Patent: *Apr. 14, 2009

(54) METHOD AND APPARATUS FOR CONTROLLING CONNECTIONS OF PC CARDS AND A PASSIVE-CARD-ADAPTING CARD USED FOR CONNECTING ONE OF THE PC CARDS TO THE APPARATUS

(75) Inventors: Hitoshi Yamamoto, Hyogo-ken (JP); Hiromasa Kusakabe, Hyogo-ken (JP); Kazuhito Akiyama, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/072,593

(22) Filed: Feb. 27, 2008

(65) Prior Publication Data

US 2008/0162765 A1 Jul. 3, 2008

Related U.S. Application Data

(63) Continuation of application No. 10/816,063, filed on Mar. 31, 2004, now Pat. No. 7,363,413.

(30) Foreign Application Priority Data

| Mar. 31, 2003 | (JP) | 2003-094915 |
| Mar. 31, 2003 | (JP) | 2003-095000 |
| Mar. 31, 2003 | (JP) | 2003-095019 |
| Mar. 1, 2004 | (JP) | 2004-056362 |
| Mar. 1, 2004 | (JP) | 2004-056365 |
| Mar. 1, 2004 | (JP) | 2004-056368 |

(51) Int. Cl.
*G06F 13/00* (2006.01)
*G06K 7/06* (2006.01)
*H01R 31/06* (2006.01)

(52) U.S. Cl. .................... 710/302; 710/10; 710/14; 710/301; 710/314; 709/249; 235/441

(58) Field of Classification Search .................. None
See application file for complete search history.

(56) References Cited

U.S. PATENT DOCUMENTS 4,191,942 A 3/1980 Long (Continued)

FOREIGN PATENT DOCUMENTS

JP 2000-259510 9/2000

OTHER PUBLICATIONS

U.S. Appl. No. 10/067,481 of Hitoshi Yamamoto, filed Feb. 5, 2002.
U.S. Appl. No. 10/246,212 of Kazuhito Akiyama, filed Sep. 18, 2002.
U.S. Appl. No. 10/282,728 of Hitoshi Yamamoto, filed Oct. 29, 2002.

(Continued)

*Primary Examiner*—Paul R Myers
*Assistant Examiner*—Brian T Misiura
(74) *Attorney, Agent, or Firm*—Cooper & Dunham, LLP

(57) ABSTRACT

A PC card control apparatus includes a PC card connector, a card detector and an interconnection switching circuit. The PC card connector is configured to provide connections for connecting one of a first PC card compliant with specific card standards and a card-adapting card for connecting a second PC card compliant with a different card standard to the PC card control apparatus. The card detector is configured to detect connection of the card-adapting card to the PC card control apparatus and to subsequently output a detection signal. The interconnection switching circuit is configured to switch the connections of the PC card connector to connect the PC card connector to a bus interface dedicated to the second card upon receiving the detection signal from the card detector.

11 Claims, 15 Drawing Sheets

U.S. PATENT DOCUMENTS

| | | | |
|---|---|---|---|
| 5,291,189 | A | 3/1994 | Otake et al. |
| 5,515,482 | A | 5/1996 | Yamamoto et al. |
| 5,664,078 | A | 9/1997 | Yamamoto et al. |
| 5,771,046 | A | 6/1998 | Izawa et al. |
| 5,895,502 | A | 4/1999 | Yamamoto |
| 5,920,731 | A | 7/1999 | Pletl et al. |
| 5,930,496 | A | 7/1999 | MacLaren et al. |
| 5,982,398 | A | 11/1999 | Yamamoto |
| 6,061,746 | A | 5/2000 | Stanley et al. |
| 6,122,175 | A | 9/2000 | Shieh |
| 6,232,986 | B1 | 5/2001 | Yamamoto |
| 6,438,638 | B1 | 8/2002 | Jones et al. |
| 6,470,284 | B1 | 10/2002 | Oh et al. |
| 6,480,920 | B1 | 11/2002 | Akiyama |
| 6,684,283 | B1 | 1/2004 | Harris et al. |
| 6,718,274 | B2 | 4/2004 | Huang et al. |
| 6,898,766 | B2 | 5/2005 | Mowery et al. |
| 6,970,964 | B2 | 11/2005 | Mowery et al. |
| 7,070,453 | B1 | 7/2006 | Chen |
| 2003/0038177 | A1 | 2/2003 | Morrow |
| 2003/0041284 | A1 | 2/2003 | Mambakkam et al. |
| 2003/0084220 | A1 | 5/2003 | Jones et al. |
| 2003/0112567 | A1 | 6/2003 | Sun |
| 2003/0172263 | A1 | 9/2003 | Liu |
| 2004/0039854 | A1 | 2/2004 | Estakhri et al. |
| 2004/0059860 | A1 | 3/2004 | Liu et al. |
| 2004/0133712 | A1 | 7/2004 | Yamamoto et al. |
| 2005/0198399 | A1 | 9/2005 | Stancil |
| 2005/0233643 | A1 | 10/2005 | Tsay et al. |
| 2005/0258243 | A1 | 11/2005 | Hsieh |

OTHER PUBLICATIONS

U.S. Appl. No. 10/656,434 of Hitoshi Yamamoto, filed Sep. 5, 2003.

U.S. Appl. No. 10/664,386 of Hitoshi Yamamoto et al., filed Sep. 18, 2003.

PCMCIA PC Card Bus Description, PC Card Pinout and Signal Names- "PCMCIA 16 bit Bus"-available at "http://www.interfacebus.com/Design_Connector_PCMCIA.html".

PCMCIA PC Card Bus Description, PC Card Pinout and Signal Names- "PCMCIA 32 bit Bus"-available at "http://www.interfacebus.com/Design_Connector_PCMCIA.html".

PCMCIA ExpressCard Description, PinOut and Signal Names- "PMCIA Express Card"-Available at "http://www.interfacebus.com/Design_Connector_PCMCIA.html".

"ExpressCard: Superfast I/O"—available at "http://www.pcmag.com/article2/0,4149,1472734,00.asp"—dated Feb. 17, 2004.

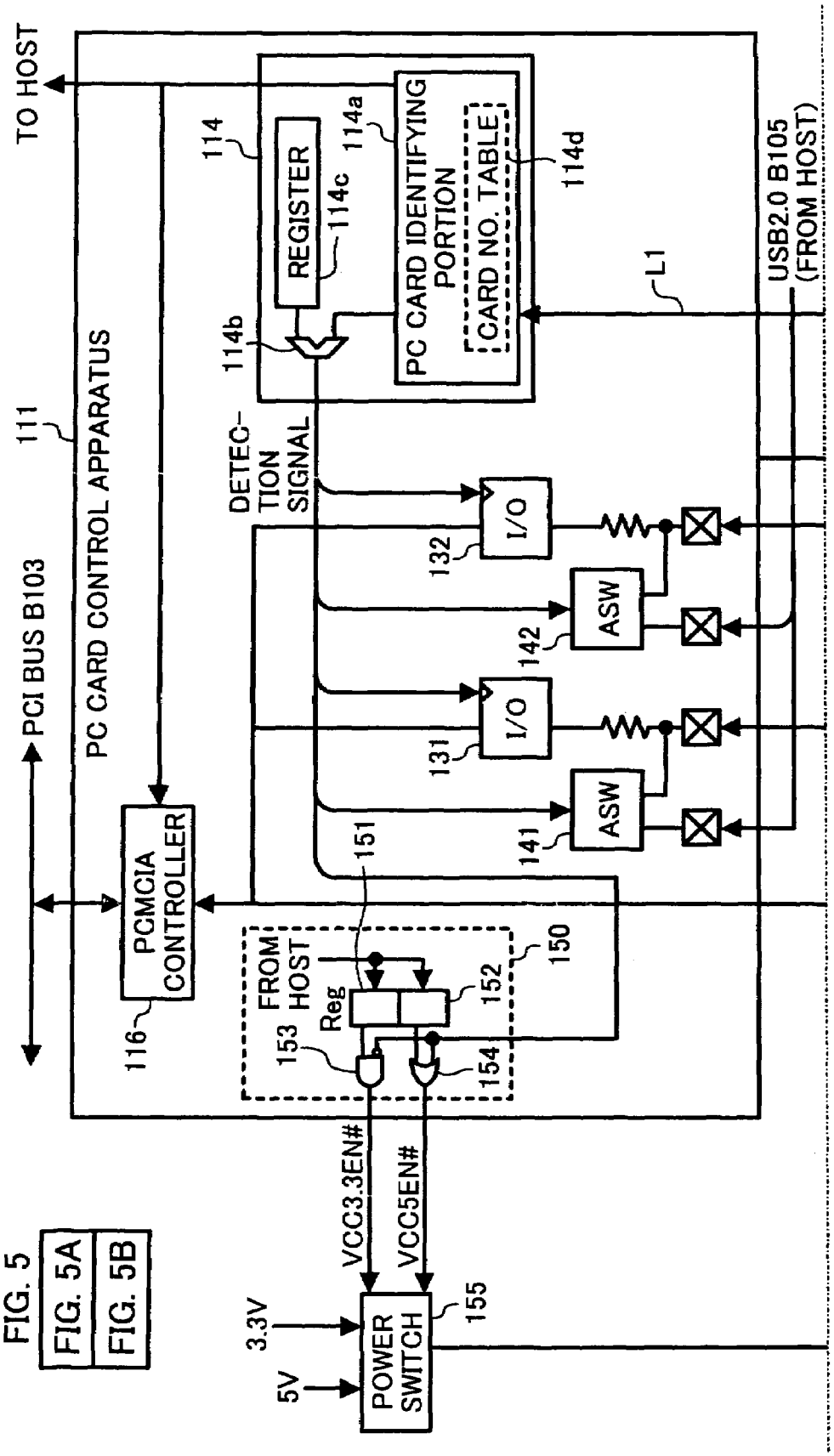

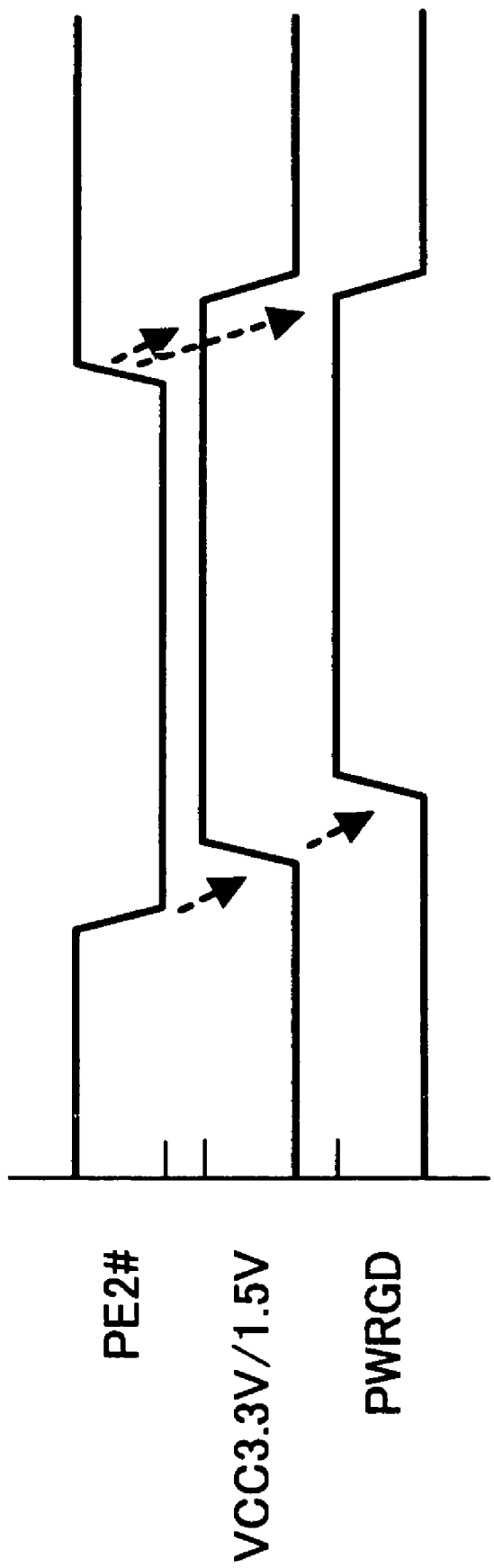

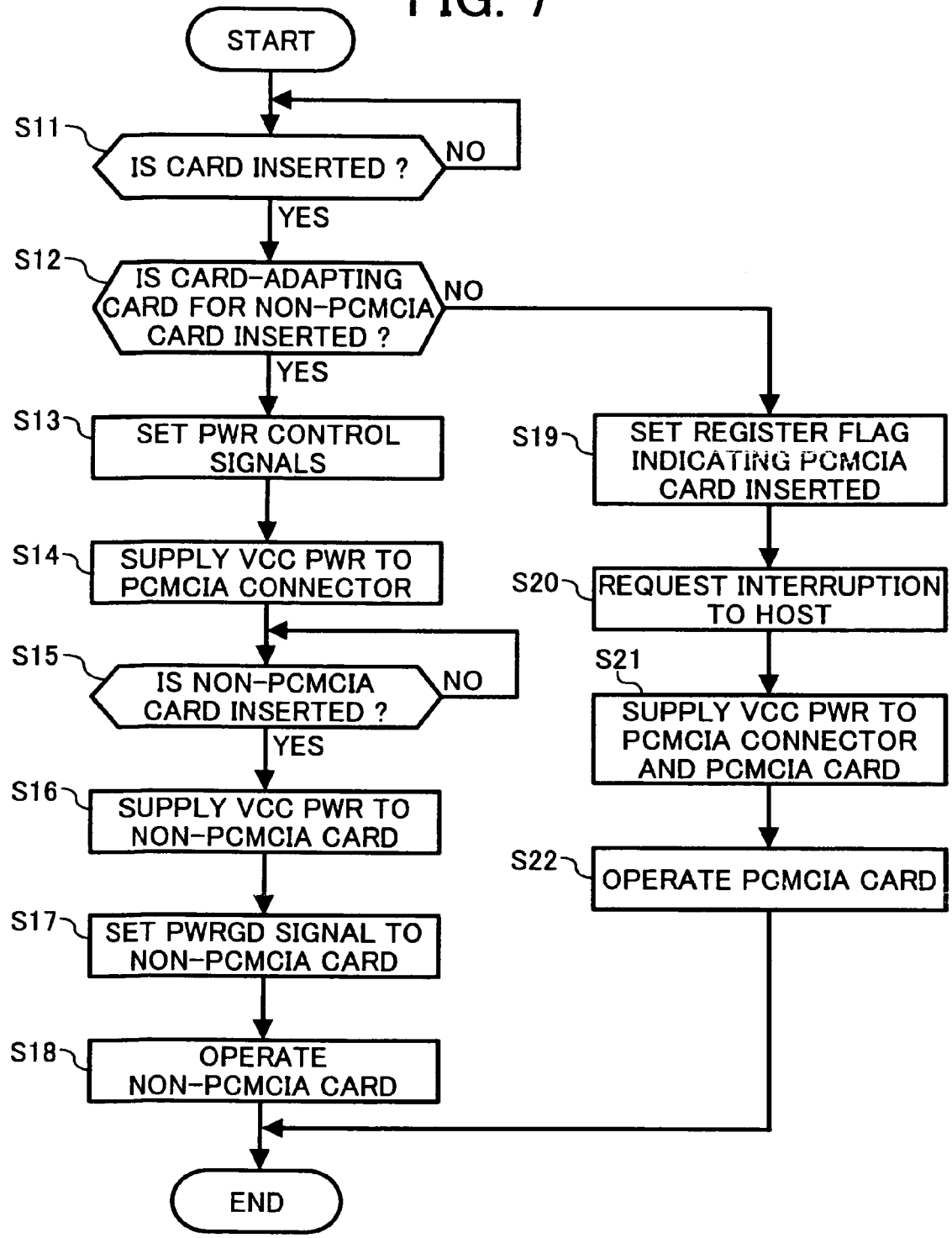

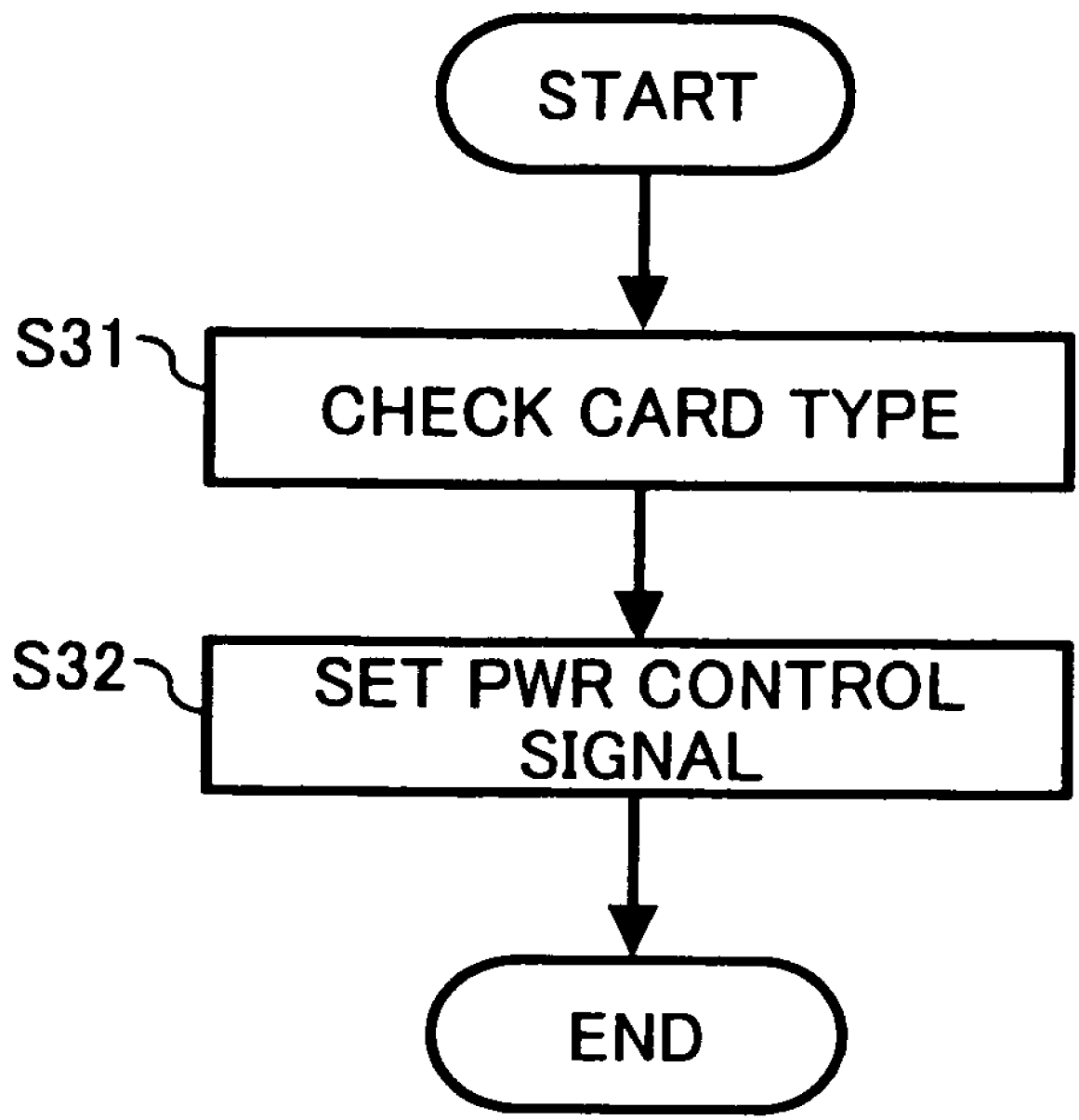

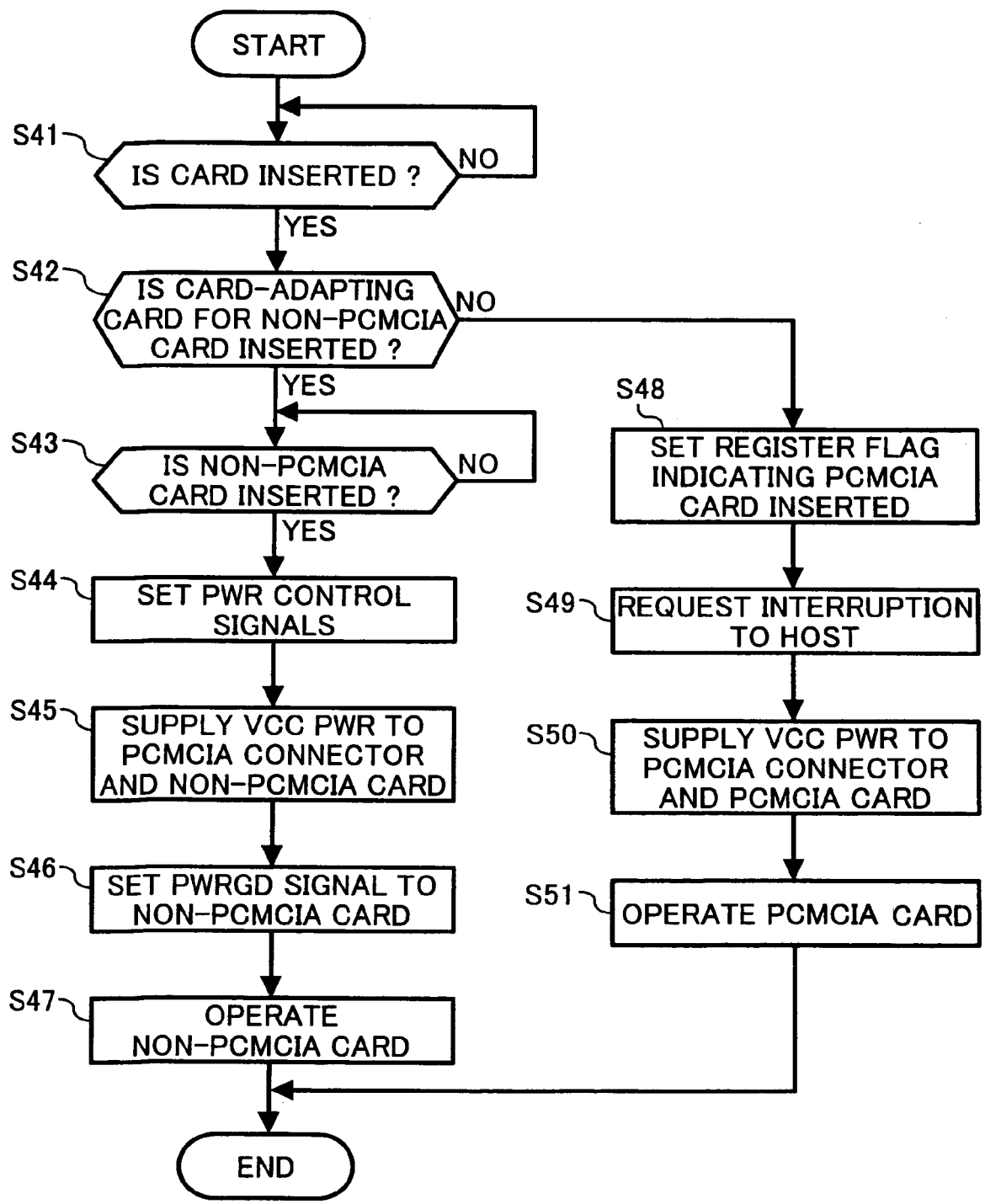

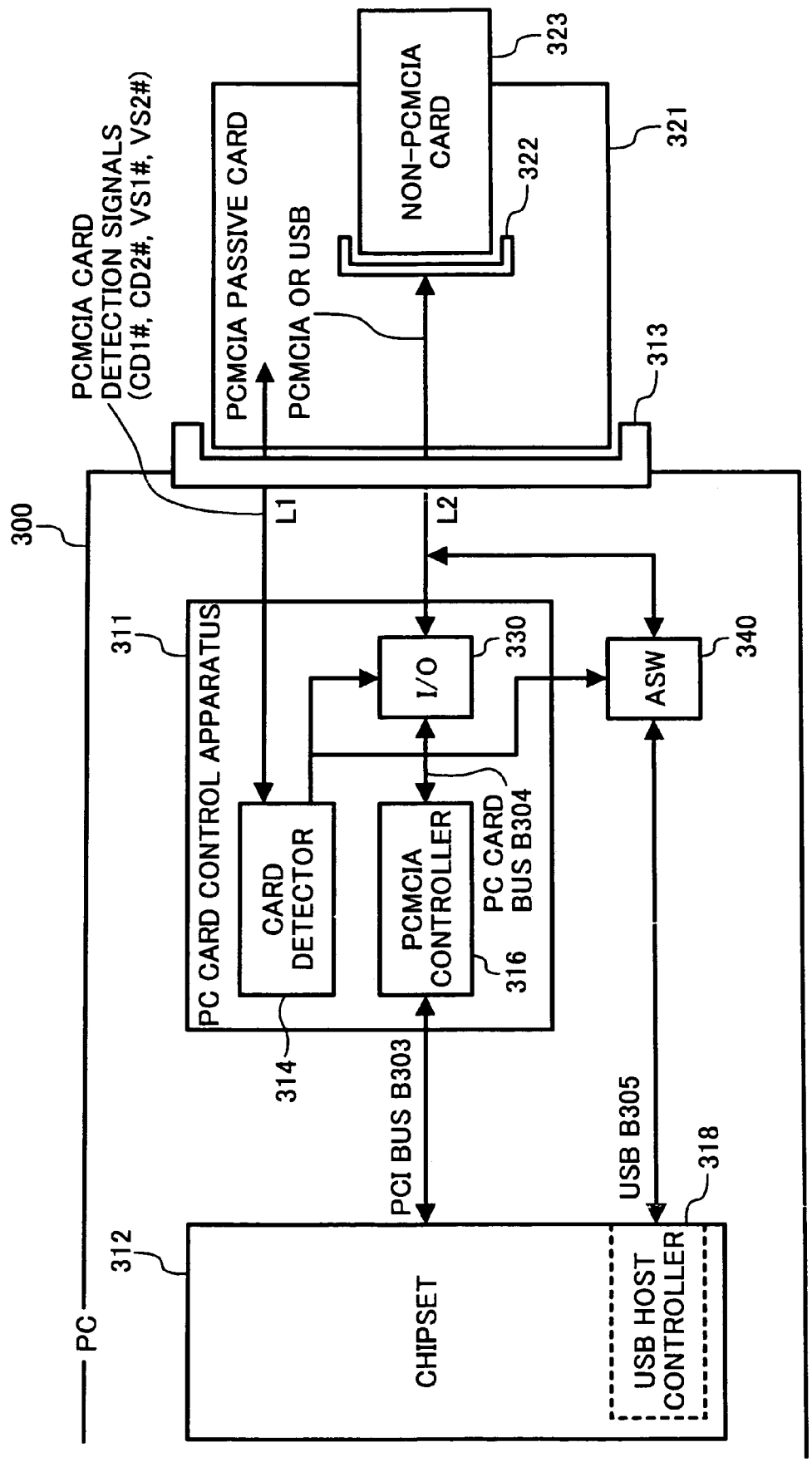

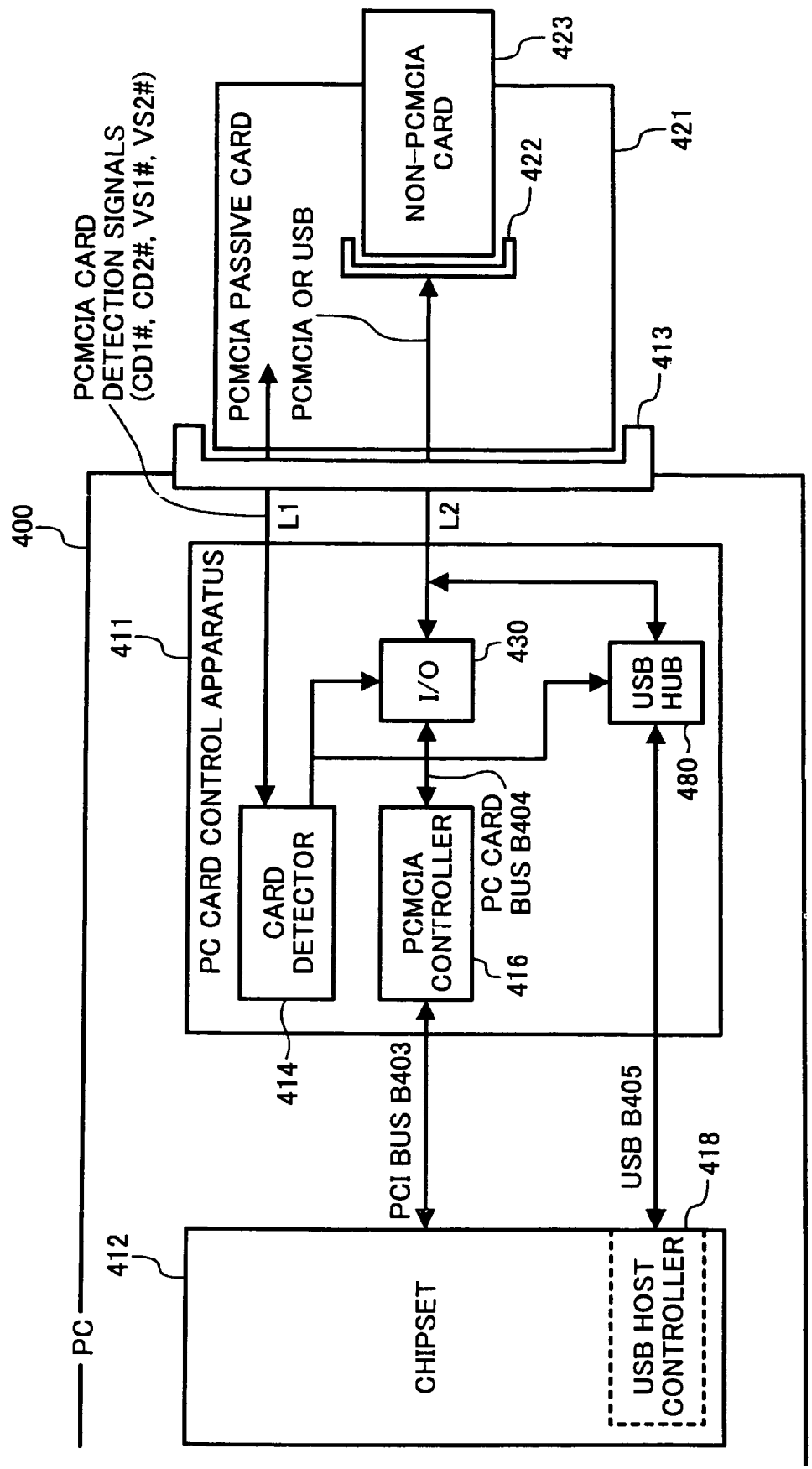

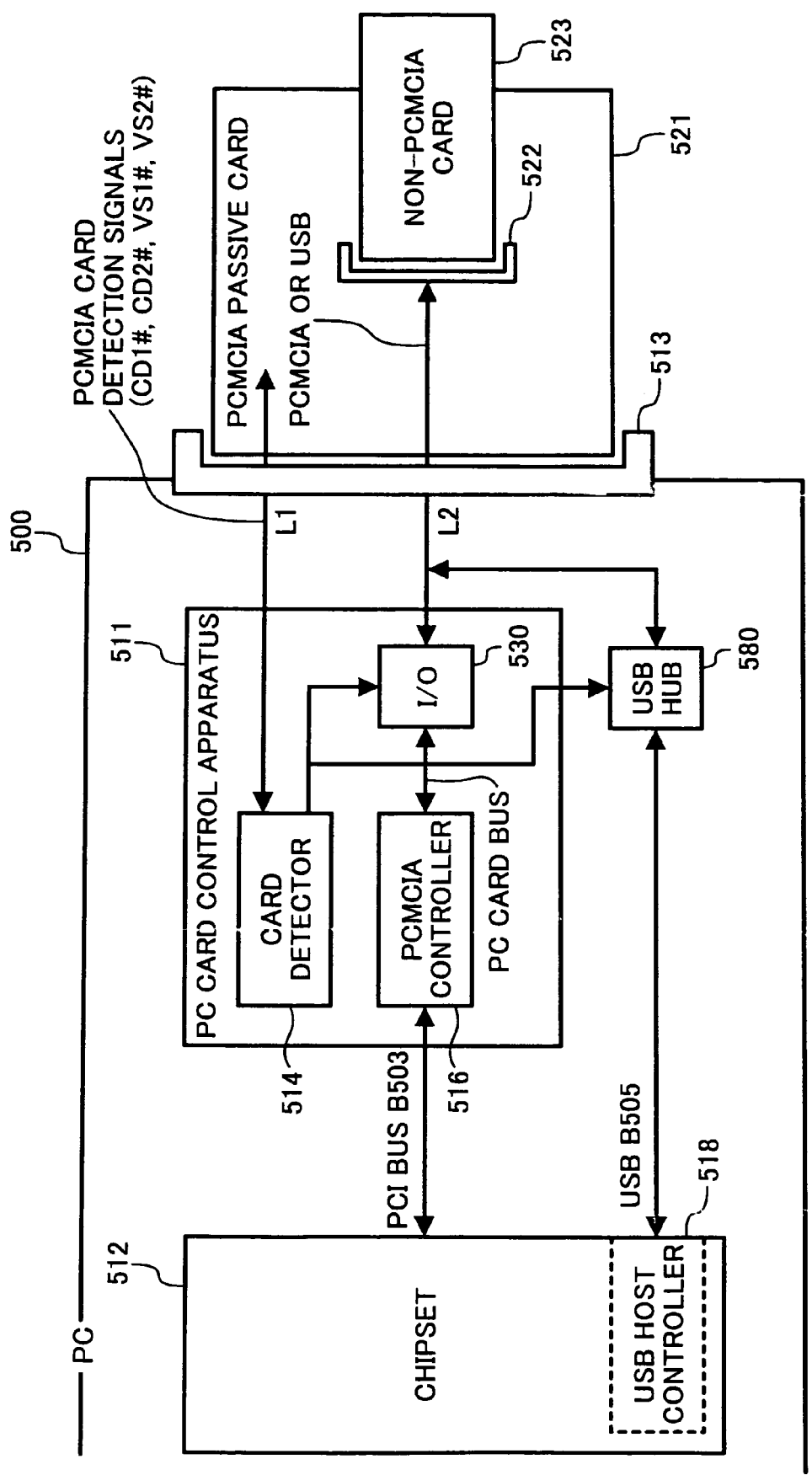

METHOD AND APPARATUS FOR CONTROLLING CONNECTIONS OF PC CARDS AND A PASSIVE-CARD-ADAPTING CARD USED FOR CONNECTING ONE OF THE PC CARDS TO THE APPARATUS

CROSS-REFERENCE TO RELATED APPLICATIONS

This application is a Rule 1.53(b) continuation of Ser. No. 10/816,063, filed Mar. 31, 2004 now U.S. Pat. No. 7,363,413, the entire contents of each of which are incorporated by reference herein.

BACKGROUND

1. Field

This patent specification describes a method and device for controlling PC cards used for a personal computer and a passive-card-adapting card, and more particularly to a method and device for controlling different types of PC cards used for the personal computer without changing a control program of a host computer of the personal computer and a passive-card-adapting card for a new PC card.

2. Discussion of the Background

A mobile terminal device or a personal computer such as a notebook or laptop computer typically includes a PC card control apparatus which is compliant with the PCMCIA (Personal Computer Memory Card International Association) standard. The PC card control apparatus supports data reading and writing of an existing PC card having a size of a business card. In recent years, mobile terminal devices have been downsized and a new card employing an efficient bus interface such as USB2.0 and PCIexpress has been produced. As a result, a new card control apparatus has been proposed for supporting data reading and writing of the new card.

The PC card control apparatus for the existing PC card has widely been used and it seems a transition of use from the existing PC card to the new PC card may take some time. Until the new PC card completely takes over the existing PC card, the existing PC card and the new PC card may be required to coexist. During the above-described time period, a PC card controlling system which can adapt to both of the existing PC card and the new PC card is needed.

In order to distinguish types of PC cards, hereinafter, the existing PC card is referred to as a "PCMCIA card" and the new PC card is referred to as a "non-PCMCIA card" in the present patent specification.

Some conventional PC card controlling systems have been proposed. One of the conventional PC card controlling systems includes a PC card control apparatus for controlling the non-PCMCIA card in addition to another PC card control apparatus for controlling the PCMCIA card. This configuration of a conventional PC card controlling system requires the terminal device to mount two different card connectors and the PC card controlling system may not be reduced in size.

Instead of having the two PC card control apparatuses, another conventional PC card controlling system supports a PCMCIA active card-adapting card which completely converts functions of the non-PCMCIA card to functions of the PCMCIA card, and converts a power supply level of the non-PCMCIA card to the PCMCIA card, if necessary. This configuration, however, forces a user to carry the non-PCMCIA card and the large and heavy PCMCIA active card-adapting card, which is inconvenient for the user.

There is another conventional PC card controlling system which includes a PC card control apparatus and supports a PCMCIA passive-card-adapting card. The PC card control apparatus recognizes insertion of the non-PCMCIA card and connects the inserted non-PCMCIA card to a controller for the non-PCMCIA card. The PCMCIA passive-card-adapting card is compact and light weight and requires a change of signal wiring to convert a signal pin assignment of the non-PCMCIA card to that of the corresponding PCMCIA card.

Referring to FIG. 1, a structure of a conventional computer system 10 utilizing a PCMCIA passive-card-adapting card 21 is described. The computer system 10 includes a PC card control apparatus 11 and a chipset 12 connected to each other.

The PC card control apparatus 11 is an extension board having a PC card connector 13 and includes a PC card detector 14, a MUX (multiplexer) 15, a PCMCIA controller 16 and a USB (universal serial bus) host controller 17.

The chipset 12 is mounted on a mother board having a PCI (peripheral components interconnect) bus card socket (not shown) for connecting the PC card control apparatus 11. The chipset 12 supports a CPU (central processing unit) (not shown), a memory (not shown) and a USB host controller 18.

The PC card connector 13 is connected with signal lines which respectively correspond to the PC card detector 14 and the multiplexer 15 and communicates with the PCMCIA passive-card-adapting card 21 compliant with the PCMCIA standard. The PCMCIA passive-card-adapting card 21 includes a non-PCMCIA card connector 22 for a non-PCMCIA card 23 and a connecting portion (not shown) to be connected to the PC card connector 13 of the PC card control apparatus 11 installed in the computer system 10. The PCMCIA passive-card-adapting card 21 converts a signal pin assignment of the non-PCMCIA card 23 to that of a PCMCIA card (not shown).

The PC card detector 14 determines whether a card attached to the PCMCIA card connector 13 is a PCMCIA card or the non-PCMCIA card 23 connected via the PCMCIA passive-card-adapting card 21. When the card is determined to be a PCMCIA card, the PC card detector 14 selects a PC CardBus B1 to connect the MUX 15 and the PCMCIA controller 16. When the card is determined to be the non-PCMCIA card 23, the PC card detector 14 selects a USB B2 to connect the MUX 15 and the USB host controller 17.

The MUX 15 receives a signal indicating a type of the inserted card from the PC card detector 14 and forwards the signal to the PCMCIA controller 16 or the USB host controller 17 according to the type of the inserted PC card.

The PCMCIA controller 16 receives the signal from the MUX 15 via the PC CardBus B1 when the PCMCIA card is attached to the PCMCIA card connector 13.

The USB host controller 17 receives the signal from the MUX 15 via the USB B2 when the PCMCIA passive-card-adapting card 21 is attached to the PCMCIA card connector 13. The computer system 10 also has the USB host controller 18 embedded in the chipset 12. However, the PC card control apparatus 11 communicates with the chipset 12 via a PCI bus B3 and the USB host controller 17 is required to convert a data format of the non-PCMCIA card 23 from a format for the USB to a format for the PCI bus.

As described above, the PC card control apparatus 11 is utilized during the transition period of completely replacing the PCMCIA card to the non-PCMCIA card 23. For production, the PC card control apparatus 11 is required to have a simpler structure. Additionally, a host CPU controlling the PC card control apparatus 11, that is, the CPU supported by the chipset 12 in the present patent specification can perform a card controlling operation without changing a control program for the card controlling operation. Further, it is preferable that the PC card control apparatus 11 utilized during the transition period can be flexibly applied to a non-PCMCIA card other than the non-PCMCIA card 23 when it is produced.

There is another conventional PC card control apparatus interfacing data via a PCI bus included in the personal computer and data via a PC CardBus included in the PC card in a pass through mode. The conventional PC card control apparatus serves as a bus bridge provided between a primary side bus (the PCI bus) to which a user cannot directly have an access and a secondary bus (the PCMCIA bus) to which the user can directly have an access. With the pass through mode, a transaction performed on the primary bus can be examined without passing the bus bridge in a manner of no destruction.

The PC card control apparatus 11 of FIG. 1 needs to include the MUX 15 and the USB host controller 18 for converting the data format for the USB to the data format for the PCI bus. Therefore, the circuitry becomes large and complicated.

A power is supplied to the PCMCIA card under a control of the host CPU, that is, under a control of the CPU supported by the chipset 12 mounted on the mother board. The PCMCIA card is activated with a power supply voltage of approximately 3.3V and the non-PCMCIA card 22 is activated with a power supply voltage of approximately 1.5V in addition to that of approximately 3.3V. In order to accept another card activated with a different power supply voltage, the computer system 10 needs to additionally include a new power source and a control program for controlling the new power source, which increases the cost for running the computer system 10.

Further, the PC card control apparatus 11 uses the MUX 15 for switching the PC CardBus B1 and the USB B2. However, the MUX 15 cannot be used for a USB2.0 bus interface which is based on a new standard with a small amplitude of an activating signal.

SUMMARY

The present patent specification has been made in view of the above-described circumstances.

The object of the present patent specification is to provide a novel PC card control apparatus which has a simpler structure and easily connects a PC card compatible with a bus interface such as the USB2.0 bus interface and the PCIexpress bus interface.

The present patent specification describes a novel method for controlling connections of the PC card compliant with specific card standards and another PC card compliant with a card standard different from the specific card standard for the above-described PC card.

The present patent specification describes a passive-card-adapting card which has a simpler structure and easily connects a PC card compatible with a bus interface such as the USB2.0 bus interface and the PCIexpress bus interface, without modifying the PC card control apparatus.

In one exemplary embodiment, a novel PC card control apparatus includes a PC card connector, a card detector and an interconnection switching circuit. The PC card connector is configured to provide connections for connecting one of a first PC card compliant with specific card standards and a card-adapting card for connecting a second PC card compliant with a different card standard to the PC card control apparatus. The card detector is configured to detect connection of the card-adapting card to the PC card control apparatus and to subsequently output a detection signal. The interconnection switching circuit is configured to switch the connections of the PC card connector to connect the PC card connector to a bus interface dedicated to the second card upon receiving the detection signal from the card detector.

The specific card standards may include a PCMCIA standard.

The second PC card may be compatible with one of a USB2.0 bus interface and a PCIexpress bus interface.

The interconnection switching circuit may include one of an analog switch and a USB hub.

The above-described PC card control apparatus may further include a power supply voltage switching circuit which is configured to switch power supply voltages including first and second power supply voltages supplied to the PC card connector based on the detection signal.

The first power supply voltage may be 3.3 volts and the second power supply voltage may be 5 volts.

The power supply voltage switching circuit may include a power switching portion and a first power switch. The power switching portion is configured to issue a power supply control signal based on the detection signal. The first power switch is configured to output to the PC card connector the first power supply voltage indicated by the power supply control signal from the power switching portion.

The power switching portion of the power supply voltage switching circuit may be mounted on the PC card control apparatus and the first power switch may be provided outside the PC card control apparatus.

The above-described PC card control apparatus may further include a second power switch which is configured to be activated upon an insertion of the second PC card after receiving the first power supply voltage from the first power switch and to output in a predetermined time period a signal informing the first power supply voltage becomes stable.

Amongst the components of the above-described PC card control apparatus, at least the card detector, the interconnection switching circuit, and the power switching portion may be integrated into a one-chip IC.

This patent specification also describes, in one embodiment, a novel method of controlling connections of first and second PC cards which includes the steps of providing a PC card connector having connections for connecting one of a first PC card compliant with specific card standards and a card-adapting card having a connection for connecting a second PC card compliant with a different card standard to a PC card control apparatus, detecting insertion of the card-adapting card in the PC card control apparatus, outputting a detection signal upon a time the detecting step detects the insertion of the card-adapting card, and switching the connections of the PC card connector to connect the PC card connector to a bus interface dedicated to the second PC card upon receiving the detection signal output by the outputting step.

The above-described novel method of controlling connections of first and second PC cards may further include the steps of altering power supply voltages including first and second power supply voltages supplied to the PC card connector based on the detection signal.

The above-described novel method of controlling connections of first and second PC cards may further include the steps of issuing a power supply control signal based on the detection signal and sending the first power supply voltage indicated by the power supply control signal issued by the issuing step.

The above-described novel method of controlling connections of first and second PC cards may further include the steps of waiting for insertion of the second PC card in the card-adapting card and outputting, in a predetermined time period after receiving the first power supply voltage, a signal informing the first power supply voltage becomes stable.

Further, in one exemplary embodiment, a novel PC card control apparatus includes a PC card connector, a card detector and an interconnection switching circuit. The PC card connector is configured to provide connections for connecting one of a first PC card compliant with specific card standards and a second PC card compliant with a different card standard to the PC card control apparatus. The card detector is configured to detect insertion of the second PC card in the PC card control apparatus and to subsequently output a detection signal. The interconnection switching circuit is configured to switch the connections of the PC card connector to connect the PC card connector to a bus interface dedicated to the second PC card upon receiving the detection signal from the card detector.

This patent specification also describes, in one embodiment, a novel method of controlling connections of first and second PC cards includes the steps of providing a PC card connector having connections for connecting one of a first PC card compliant with specific card standards and a second PC card compliant with a different card standard to a PC card control apparatus, detecting connection of the second PC card to the PC card control apparatus, outputting a detection signal upon a time the detecting step detects the insertion of the second PC card, and switching the connections of the PC card connector to connect the PC card connector to a bus interface dedicated to the second PC card upon receiving the detection signal output by the outputting step.

Further, in one embodiment, a novel passive-card-adapting card includes a first card connector, a second card connector and a regulator. The first card connector is configured to be compatible with specific card standards for a first PC card and to connect the passive-card-adapting card to a PC card control apparatus. The second card connector is configured to have a connection for connecting a second PC card compliant with a card standard different from the specific card standards for the first PC card. The regulator is configured to regulate a power supply voltage supplied by the PC card control apparatus in order to adapt the power supply voltage for the second PC card.

This patent specification also describes, in one embodiment, a novel method of controlling a passive-card-adapting card includes the steps of providing a connection for connecting the passive-card-adapting card to a PC card control apparatus, the passive-card-adapting card being compatible with specific card standards for a first PC card, regulating a power supply voltage supplied by the PC card control apparatus in order to adapt the power supply voltage for a second PC card compliant with a card standard different from the specific card standards for the first PC card, and providing a connection for connecting the second PC card.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A and 5B are illustrations of a detailed structure of the PC card control apparatus of FIG. 2;

FIG. 6 is a timing chart of signals issued in a PCMCIA passive-card-adapting card;

FIG. 7 is a flowchart of card recognition operations performed by the PC card control apparatus of the exemplary embodiment;

FIG. 8 is a flowchart of card recognition operations performed by a host computer of the exemplary embodiment;

FIG. 11 is a flowchart of card recognition operations performed by the PC card control apparatus of the exemplary embodiment;

FIG. 12 is an illustration of a structure of another computer system including a PC card control apparatus of another exemplary embodiment according to the present patent specification;

FIG. 13 is an illustration of a structure of another computer system including a PC card control apparatus of another exemplary embodiment according to the present patent specification; and FIG. 14 is an illustration of a structure of another computer system including a PC card control apparatus of another exemplary embodiment according to the present patent specification.

DETAILED DESCRIPTION OF THE PREFERRED EMBODIMENTS

Figure 1:
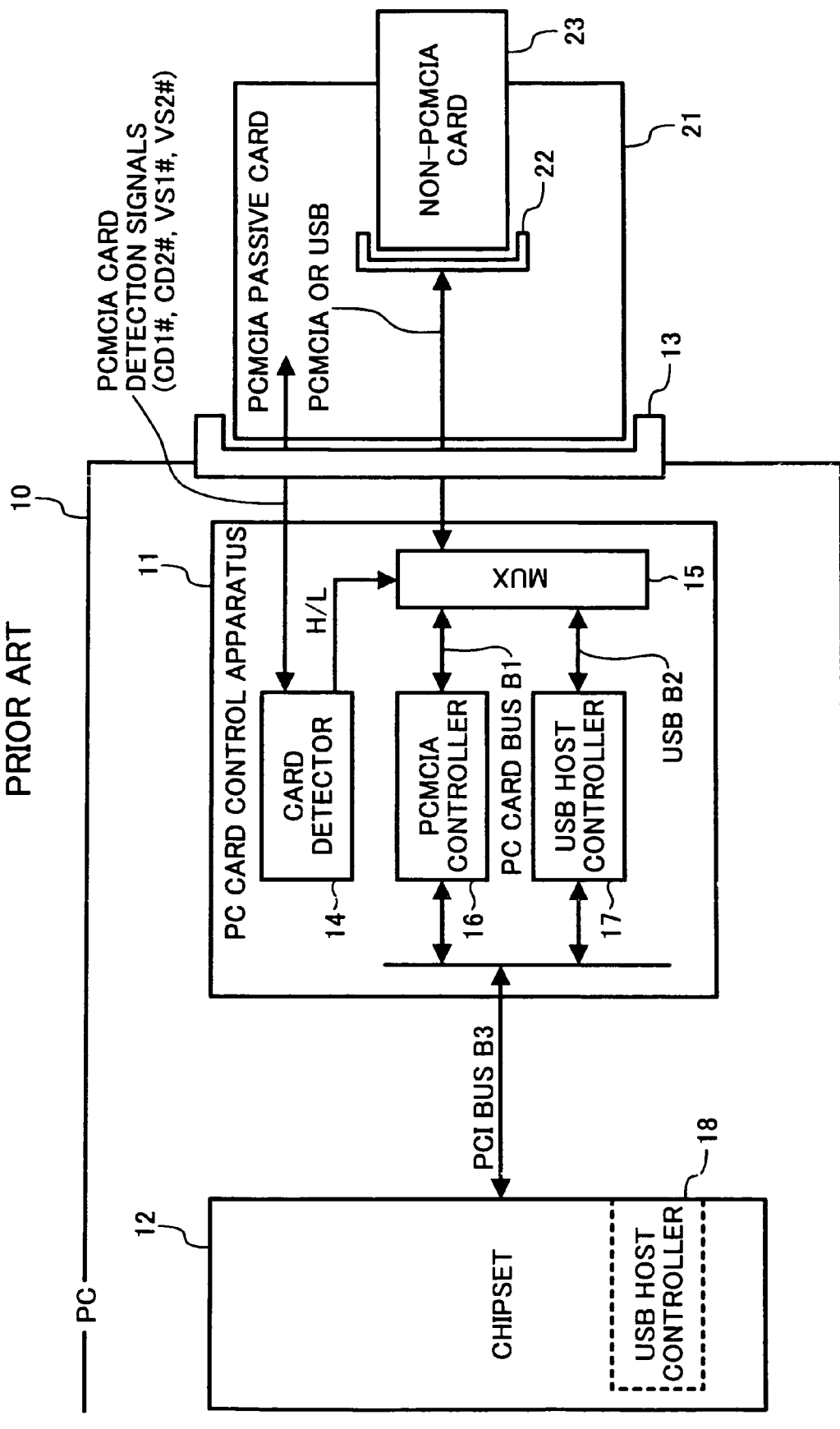
FIG. 1 is an illustration showing a structure of a computer system including a conventional PC card control apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2:
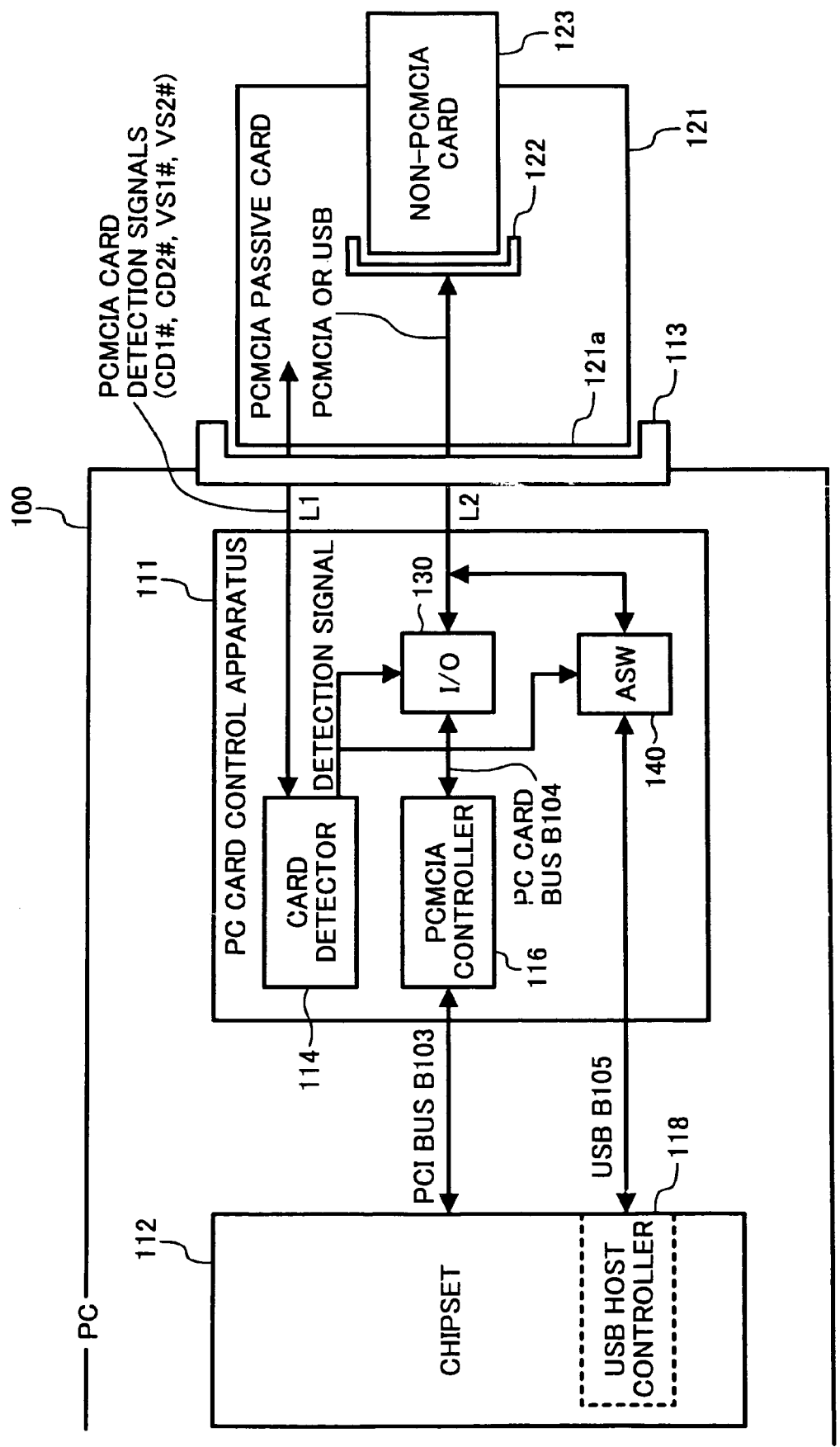
FIG. 2 is an illustration showing a structure of a computer system including a PC card control apparatus of an exemplary embodiment according to the present patent specification.

Referring now to the drawings, wherein like reference numerals designate identical or corresponding parts throughout the several views, and particularly to FIG. 2, a structure of a computer system 100 is described according to an exemplary embodiment of the present patent specification.

As shown in FIG. 2, the computer system 100 includes a PC card control apparatus 111 and a chipset 112 connected to each other.

The PC card control apparatus 111 is, for example, an extension board having a PC card connector 113 and includes a PC card detector 114, an I/O circuit 130 and an analog switch ("ASW" in FIG. 2) 140.

The chipset 112 is, for example, mounted on a mother board having a socket (not shown) for the extension board supporting a PCI bus B103 and a USB B105 used for the PC card control apparatus 111, and supports a CPU (not shown), a memory (not shown) and a USB host controller 118.

The PC card control apparatus 111 may be integrated into a one-chip IC (integrated circuit) so that the PC card control apparatus 111 can be downsized. In addition, the PC card control apparatus 111 integrated into the one-chip IC can be connected to the chipset 112 through a small socket for IC. This allows the limited number of extension board sockets to be efficiently used.

The PC card control apparatus 111 communicates with a PCMCIA passive-card-adapting card 121 through four control lines L1 and data lines L2, which will be described below. The PCMCIA passive-card-adapting card 121 compliant with the PCMCIA standard includes a non-PCMCIA card connector 122 for a non-PCMCIA card 123 and an interconnect area 121a to be connected to the PC card connector 113 of the computer system 100. The PCMCIA passive-card-adapting card 121 converts a signal pin assignment of the non-PCMCIA card 123 to that of a PCMCIA card (not shown).

The PC card detector 114 determines whether a card connected or attached to (or inserted in) the PC card connector 113 is the non-PCMCIA card 123 and outputs a card detection signal including a result of the detection to the set of I/O circuits 130 and the set of analog switch 140, which will be described below.

The PCMCIA controller 116 communicates with the I/O circuit 130 via a PC CardBus B104 and communicates with the chipset 112 via the PCI bus B103.

The USB host controller 118 communicates with the analog switch 140 via the USB B105.

As described above, the PC card control apparatus 111 and the PCMCIA passive-card-adapting card 121 communicate via the four control lines L1 and the data lines L2.

The four control lines L1 transfer respective card detection signals. These signals are a CD1# signal, a CD2# signal, a VS1# signal and a VS2# signal. Notations of the signals comply with the PCMCIA standard. One end of the four control lines L1 is electrically connected to the PC card detector 114. The other end is also electrically connected to the interconnect area 121a of the PCMCIA passive-card-adapting card 121. The interconnect area 121a has pin connection holes as a female connector so that the respective four pin may be connected.

One end of the data lines L2 is connected via the PCMCIA card connector 113 to the PCMCIA passive-card-adapting card 121 or the non-PCMCIA card 123. The other end of the data lines L2 is separated to be connected via the I/O circuit 130 to the PCMCIA controller 116 and to be connected via the analog switch 140 to the USB B105 for the chipset 112 of the computer system 100.

The I/O circuit 130 includes a first I/O circuit 131 and a second I/O circuit 132 and is enabled when the card detection signal received is a low-level signal. The first and second I/O circuits 131 and 132 will be described below with reference to FIG. 3.

Figure 3:
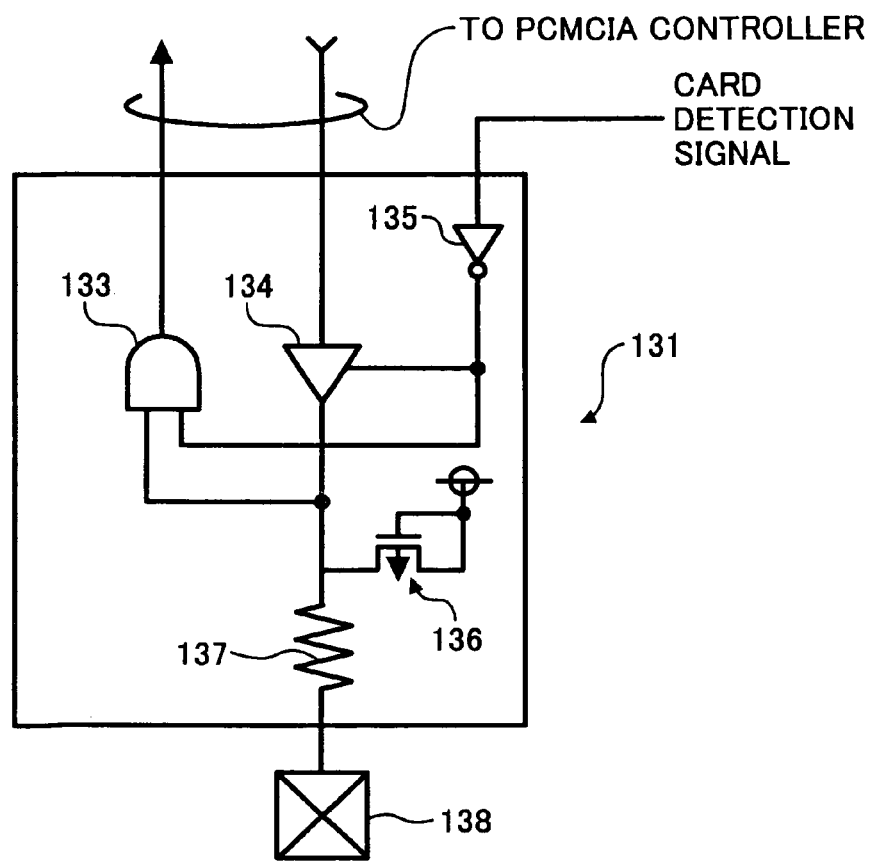
FIG. 3 is an illustration showing a structure of an I/O circuit provided in the PC card control apparatus of FIG. 2.

Referring to FIG. 3, a structure of the first I/O circuit 131 is described. Since structures of the second I/O circuit 132 is identical to the first I/O circuit 131, FIG. 3 is described focusing on the structure of the first I/O circuit 131. The first I/O circuit 131 includes a two-input AND gate 133, a tri-state buffer 134, an inverter 135, a transistor 136 and a resistor 137. The two-input AND gate 133 is a gate in which data applied from the PCMCIA card connector 113 to a connection pad 138 is output to the PCMCIA controller 116. One signal input terminal of the two-input AND gate 133 receives a signal sent from the connection pad 138 and the other signal input terminal receives the card detection signal sent from the card detector 114 via the inverter 135. The tri-state buffer 134 is a buffer circuit in which data sent from the PCMCIA controller 116 is output to the connection pad 138. The tri-state buffer 134 switches to ON when the card detection signal which is inverted by the inverter 135 is in a high level.

Referring again to FIG. 2, the analog switch 140 has a particular attribute similar to a mechanical relay to properly transfer a signal with a small amplitude and a high frequency, such as a signal complying with the USB2.0 standard.

The analog switch 140 includes a first analog switch 141 and a second analog switch 142 and is enabled when the card detection signal received is a high level signal. The first and second analog switches 141 and 142 will be described below with reference to FIG. 4.

Figure 4:
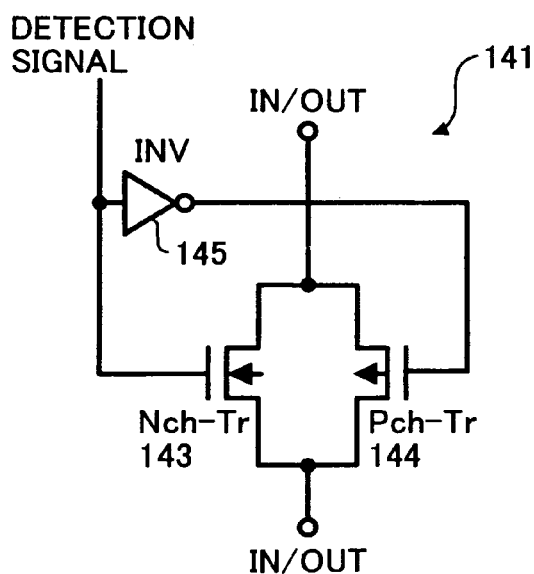
FIG. 4 is an illustration showing a structure of an analog switch provided in the PC card control apparatus of FIG. 2.

Referring to FIG. 4, a structure of the first analog switch 141 is described. Since a structure of the second analog switch 142 is identical to the first analog switch 141, FIG. 4 is described focusing on the structure of the first analog switch 141.

The first analog switch 141 includes a pair of a N-channel MOSFET 143 and a P-channel MOSFET 144 and an inverter 145. The source and drain of the N-channel MOSFET 143 are connected to those of the P-channel MOSFET 144. The inverter 145 inputs an inversion signal to a gate of the P-channel MOSFET 144.

Referring again to FIG. 2, card recognizing operations are described.

The PC card detector 114 determines a type of a card connected or attached to (or inserted in) the PCMCIA card connector 113. When the inserted card is determined to be a PCMCIA card, the PC card detector 114 outputs a low-level card detection signal. When the inserted card is determined to be the non-PCMCIA card 123, the PC card detector 114 outputs a high-level card detection signal which is also referred to as a non-PCMCIA card detection signal.

When a PCMCIA card is connected, the I/O circuit 130 enables a data line between the PCMCIA card connector 113 and the PCMCIA controller 116 and turns the analog switches 140 to OFF. Consequently, the PCMCIA card connector 113 and the PCMCIA controller 116 are connected via the data line. Data read from the PCMCIA card is transmitted through the data lines L2, the I/O circuit 130 and the PC CardBus B104, and is output to the PCMCIA controller 116. Then, the data is further conveyed from the PCMCIA controller 116 through the PCI bus B103 to the chipset 112. Since the PCI bus B103 and the set of I/O circuit 130 communicate in a bidirectional manner, the data sent from the chipset 112 is transmitted to the PCMCIA card via the PCI bus B103, the PCMCIA controller 116, the PCMCIA card bus B104, the I/O circuits 130 and the data lines L2.

When the non-PCMCIA card 123 is connected, the I/O circuit 130 disables the data line between the PCMCIA card connector 113 and the PCMCIA controller 116 and turns the analog switches 140 to ON. Consequently, the PCMCIA card connector 113 and the USB B105 are connected via the data line. Data read from the non-PCMCIA card 123 is transmitted through the data lines L2, the analog switch 140 and the USB B105, and is output to the USB host controller 118 directly mounted on the chipset 112. The USB B105 and the analog switch 140 communicate in a bidirectional manner. Therefore, the data sent from the chipset 112 is transmitted to the non-PCMCIA card 123 via the USB B105, the analog switches 140 and the data lines L2.

Figure 5B:
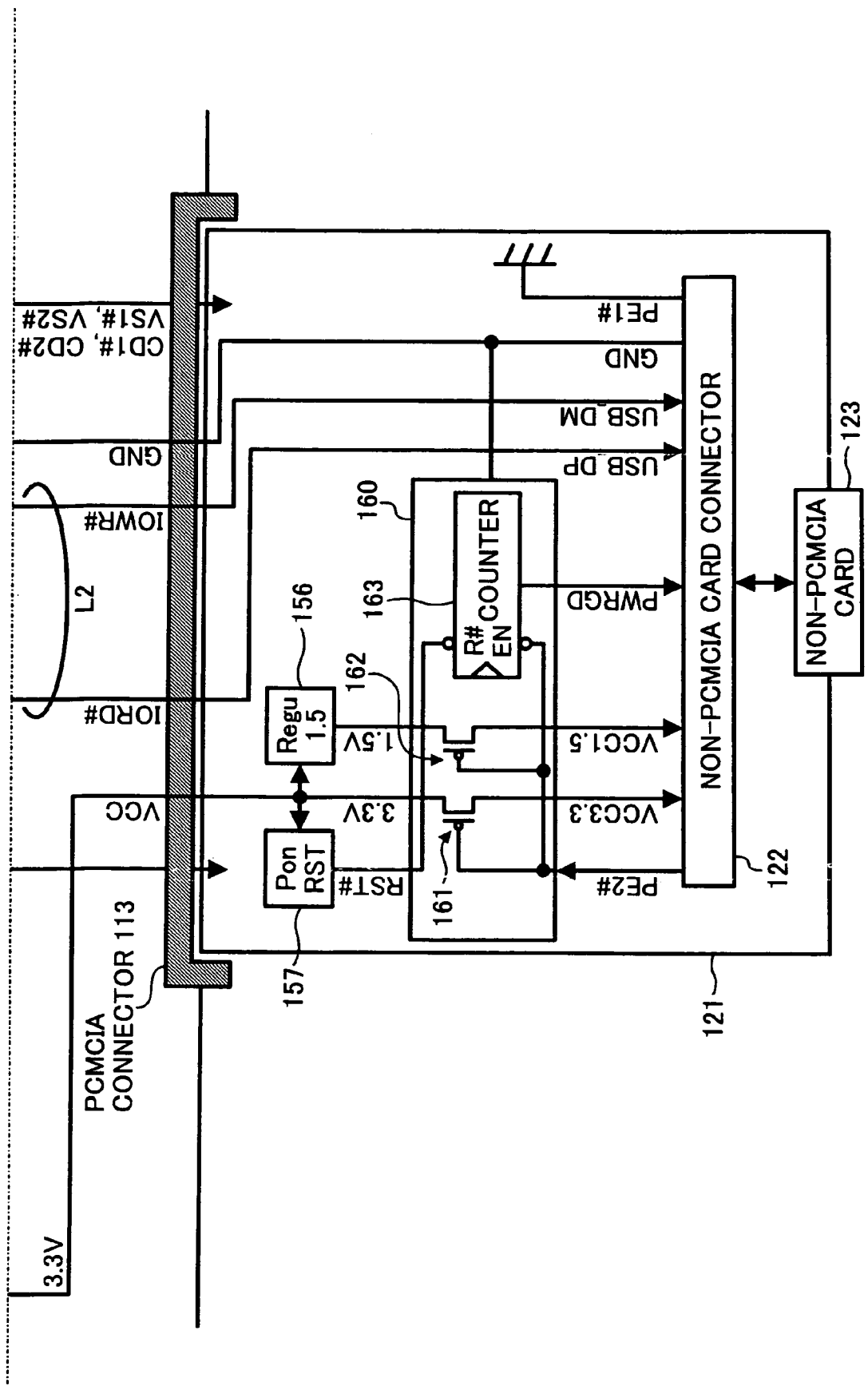

Referring to FIG. 5, an internal structure of the PC card control apparatus 111 and the PCMCIA passive-card-adapting card 121 will be discussed. FIG. 5 illustrates power switching circuits, such as a power switching portion 150 and a first power switch 155 and a second power switch 160, for switching a power supply voltage according to a type of the card. Lines used for transmitting a read signal which is referred to as an IORD# signal and a write signal which is referred to as an IOWR# signal correspond to the data lines L2 in FIG. 2. One end of the IORD# signal is connected to a USB_DP (plus) pin of the non-PCMCIA card connector 122 of the PCMCIA passive-card-adapting card 121 and the other end is connected to a signal input terminal (not shown) of the first I/O circuit 131. One end of the IOWR# signal is connected to a USB_DM (minus) pin of the non-PCMCIA card connector 122 of the PCMCIA passive-card-adapting card 121 and the other end is connected to a signal input terminal (not shown) of the second I/O circuit 132.

The PC card detector 114 of FIG. 5 includes a PCMCIA card identifying portion 114a, a comparator 114b and a register 114c.

The PCMCIA card identifying portion 114a includes a card number table 114d complying with the PCMCIA standard to specify a card number which identifies a type of a bus width, a drive voltage and so on of a card which is connected to the PCMCIA card connector 113, according to procedures complying with the PCMCIA standard.

The comparator 114b compares the card number specified by the PCMCIA card identifying portion 114a and the card number of the non-PCMCIA card stored in the register 114c. When the two card numbers match, the comparator 114b outputs a non-PCMCIA card detection signal which is in a high level.

In the PCMCIA card and the passive-card-adapting card 121, two of the four pin connection holes are selectively connected to the PC card control apparatus 111 according to the type of the card. Namely, the pin connection holes are selected based on a determination whether the card inserted in the PC card control apparatus 111 is a PCMCIA card or the non-PCMCIA card 123 or whether the drive voltage of the PCMCIA card is 3.3V or 1.5V. Another pin connection hole is grounded.

Operations of the PCMCIA card identifying portion 114a complying with the PCMCIA standard is described below. The PCMCIA card identifying portion 114a detects that a card is connected to the PCMCIA card connector 113, according to changes of electrical potentials of the CD1# signal and the CD2# signal. The PCMCIA card identifying portion 114a then switches the electrical potential of the VS1# signal to a high level for approximately 1 ms. After the electrical potential of the VS1# signal is switched, electrical potential states of the CD2#, CD1#, VS2# and VS1# signals are latched, that is, stored in a register, at intervals of approximately 0.8 ms. Subsequently, the PCMCIA card identifying portion 114a switches the electrical potential of the VS2# signal to a high level for approximately 1 ms. After the electrical potential of the VS2# signal is switched, electrical potential states of the CD2#, CD1#, VS2# and VS1# signals are latched at intervals of approximately 0.8 ms. The PCMCIA card identifying portion 114a refers to the card number table complying with the PCMCIA standard, specifies the card number corresponding to combinations of 4-bit and 8-bit signals which are latched at intervals as described above, and outputs information of the card number to the comparator 114b and to the host computer.

In a case where a signal output from the PC card detector 114 is a high-level signal, the first and second I/O circuits 131 and 132 are disabled and the first and second analog switches 141 and 142 turn to ON so that the PCMCIA card connector 116 and the USB B105 are connected to each other. On the other hand, in a case where a signal output from the card detector 114 is a low-level signal, the first and second I/O circuits 131 and 132 are enabled and the first and second analog switches 141 and 142 turn to OFF so that the PCMCIA card connector 113 and the PCMCIA controller 116 are connected to each other.

As described above, the PC card control apparatus 111 according to an exemplary embodiment of the present patent specification includes the first and second I/O circuits 131 and 132 and the first and second analog switches 141 and 142, replacing the MUX 15 and the USB host controller 17 included in the conventional PC card control apparatus 11 in FIG. 1. If the USB host controller 17 is removed, the circuit size may be minimized and the cost may be reduced. Further, the PC card control apparatus 111 employs the first and second analog switches 141 and 142 instead of the MUX 15 including a register which has a high threshold, so that a signal having a small amplification of 0.4V which complies with the UBS2.0 standard may be applied.

The power switching portion 150 includes registers 151 and 152, a two-input AND gate 153 and a two-input OR gate 154. The registers 151 and 152 receive respective register selection signals issued from the chipset 112 which serves as the host computer, and output respective power supply control signals which are selected through a combination of a high-level Vcc3.3EN# signal and a high-level Vcc5EN# signal, a combination of a high-level Vcc3.3EN# signal and a low-level Vcc5EN# signal, and a combination of a low-level Vcc3.3EN# signal and a high-level Vcc5EN# signal.

The two-input AND gate 153 receives data output from the register 152 at one signal input terminal and an inverted card detection signal output from the PC card detector 114 at the other signal input terminal.

The two-input OR gate 154 receives data output from the register 152 at one signal input terminal and a card detection signal output from the PC card detector 114 at the other signal input terminal.

When the card detection signal is in a high-level, the two-input AND gate 153 outputs a low-level Vcc3.3EN# signal according to output data from the register 152 and the two-input OR gate 154 outputs a high-level Vcc5EN# signal according to output data from the register 151.

When the card detection signal is in a low-level, the two-input AND gate 153 outputs a high-level Vcc3.3EN# signal according to the output data from the register 152 and the two-input OR gate 154 outputs a low-level Vcc5EN# signal according to the output data from the register 151.

The first power switch 155 is mounted on the outside of the PC card control apparatus 111, that is, on the outside of the computer system 100. The first power switch 155 includes two low active switches, one of which has a power of 3.3V and the other of which has a power of 5V. When the power switching portion 150 transmits a high-level Vcc3.3EN# signal and a low-level Vcc5EN# signal to the first power switch 155, the first power switch 155 outputs a power supply voltage Vcc of approximately 5V. When the power switching portion 150 transmits a low-level Vcc3.3EN# signal and a high-level Vcc5EN# signal to the first power switch 155, the first power switch 155 outputs a power supply voltage Vcc of approximately 3.3V.

The first power switch 155 may be mounted on the board of the PC card control apparatus.

As described above, the power switching portion 150 and the first power switch 155 work as voltage converting circuits for converting a power supply voltage to the PCMCIA card connector 113 according to the input of the non-PCMCIA card detection signal sent from the PC card detector 114.

The PCMCIA passive-card-adapting card 121 includes a regulator 156, the second power switch 160 and a power-on reset 157. The regulator 156 reduces a power supply voltage supplied from the first power switch 155 from 3.3V to 1.5V. The second power switch 160 supplies voltages of 1.5V and 3.3V to the non-PCMCIA card 123. The power-on reset 157 outputs a reset signal at the power-on with respect to the second power switch 160.

The second power switch 160 includes two transistor switches 161 and 162 and a counter 163. The transistor switches 161 and 162 turn to ON at a fall time of the PE2# signal when a card is connected to (or inserted in) the PCMCIA card connector 113.

Referring to FIG. 6, a timing chart of the PE2# signal, the Vcc3.3V/1.5V signal and the PWRGD signal is described. As shown in FIG. 6, the counter 163 counts a predetermined number after the PE2# signal switches to the low level and outputs a low-level PWRGD signal upon a completion of the counting.

When the non-PCMCIA card 123 is removed from the PCMCIA card connector 113, the electrical potential of the PE2# signal moves from the low level to the high level. This stops the power supply from the second power switch 160 and the output of the PWRGD signal.

Since the PCMCIA passive-card-adapting card 121 further includes the regulator 156 in the PCMCIA passive-card-adapting card 121, a compact circuit configuration may be achieved on the PC card control apparatus 111. Further, even if a card requiring another drive voltage is developed, the computer system 100 may easily be applied to the card by changing the circuit in the PCMCIA passive-card-adapting card 121.

Referring now to FIGS. 7 and 8, card control operations performed by the PC card detector 114 of the PC card control apparatus 111 having the above-described structure and the CPU supported by the chipset 112 based on data sent from the PC card detector 114 are described.

In Step S11 of FIG. 7, the PC card detector 114 determines whether a PCMCIA card or the PCMCIA passive-card-adapting card 121 is inserted in (or connected or attached to) the PCMCIA card connector 113 according to a change of potential of the card detection signals which are the CD1# signal and the CD2# signal. When it is determined neither a PCMCIA card nor the PCMCIA passive-card-adapting card 121 is inserted in Step S11, that is, when the determination result in Step S11 is NO, the process of Step S11 repeats until either a PCMCIA card or the PCMCIA passive-card-adapting card 121 is inserted. When it is determined that either a PCMCIA card or the PCMCIA passive-card-adapting card 121 is inserted in Step S11 and when the determination result in Step S11 is YES, the procedure goes to Step S12. In Step S12, the PC card detector 114 determines whether the card connected to the PCMCIA card connector 113 is a PCMCIA card or the PCMCIA passive-card-adapting card 121. When the card is determined as the PCMCIA passive-card-adapting card 121 in Step S12 and when the determination result in Step S12 is YES, the procedure goes to Step S13. In Step S13, power supply control signals, a Vcc3.3EN# signal and a Vcc5EN# signal, are set based on the card detection signal output by the PC card detector 114. After Step S13 is performed, the first power switch 155 is switched to supply a power supply voltage Vcc of approximately 3.3V to the PCMCIA connector 113 in Step S14. After Step S14 is performed, whether the non-PCMCIA card 123 is connected to the PCMCIA passive-card-adapting card 121 is determined based on the PE2 signal in Step S15.

When it is determined that the non-PCMCIA card 123 is not connected to the non-PCMCIA card connector 122 of the PCMCIA passive-card-adapting card 121 in Step S15 and when the determination result in Step S15 is NO, the process of Step S15 repeats until the non-PCMCIA card 123 is inserted. When it is determined that the non-PCMCIA card 123 is connected to the non-PCMCIA card connector 122 of the PCMCIA passive-card-adapting card 121 according to a change of the PE2# signal from the high level to the low level in Step S15 and when the determination result in Step S15 is YES, the procedure goes to Step S16. In Step S16, the PCMCIA passive-card-adapting card 121 prepares two different power supply voltages Vcc of approximately 3.3V and Vcc of approximately 1.5V and the power supply voltages Vcc of approximately 3.3V and Vcc of approximately 1.5V are supplied to the non-PCMCIA card 123. After Step S16 is performed, a counter embedded in the second power switch 160 is stopped and a PWRGD signal is set to the non-PCMCIA card 123 in Step S17. After Step S17 is performed, the non-PCMCIA card 123 becomes operable in Step S18.

When the card is determined as the PCMCIA card in Step S12 and when the determination result in Step S12 is NO, the procedure goes to Step S19. In Step S19, the PC card detector 114 sets a predetermined flag therein. After Step S19 is performed, the PC card detector 114 requests, in Step S20, an interruption to the CPU included in the chipset 112 as a host CPU. After Step S20 is performed, the PC card detector 114 waits for a response of a result obtained through operations of FIG. 8 performed by the CPU.

In Step S31 of FIG. 8, the CPU which has received the request from the PC card detector 114 recognizes a type of a bus width, a drive voltage and so on of the PCMCIA card which is connected to the PCMCIA card connector 113, based on the data sent from the PC card detector 114. After Step S31 is performed, the CPU sets, in Step S32, the power supply control signals which are the Vcc3.3EN# signal and the Vcc5EN# signal. After Step S32 is performed, the PC card detector 114 receives a result from the CPU and the procedure goes to Step 21 in FIG. 7.

In Step S21 of FIG. 7, the first power switch 155 is switched to supply the power supply voltages Vcc of approximately 3.3V and Vcc of approximately 1.5V. After Step S21 is performed, the PCMCIA card becomes operable in Step S22. Steps S19 through S22, S31 and S32 as described above are the card control operations complying with the PCMCIA standard.

As described above, the card control operations with respect to the PCMCIA card are performed such that the first power switch 155 is controlled for the PCMCIA card, based on a command issued by the CPU in Steps S31 and S32. On the other hand, the card control operations with respect to the PCMCIA passive-card-adapting card 121 corresponding to the non-PCMCIA card 123 are performed such that the first power switch 155 is not controlled by the CPU but is directly controlled based on the card detection signal issued by the PC card detector 114 in Steps S13 and S14. In addition, the card control operations with respect to the non-PCMCIA card 123 are performed such that the first power switch 155 is directly controlled by the second power switch 160 in the PCMCIA passive-card-adapting card 121 in Steps S15 through S17.

With the conventional PC card control apparatus 11 of FIG. 1, when the PCMCIA passive-card-adapting card 21 is inserted in the PCMCIA card connector 13, the PC card control apparatus 11 sends a request to the host computer to perform the card control operations with respect to the PCMCIA passive-card-adapting card 21 and performs a switch control of a power switch with a software. In this case, a control program needs to be modified to meet operations with respect to the non-PCMCIA card 23.

With the PC card control apparatus 111 of the present patent specification, the first power switch 155 is directly controlled by the card detection signal issued by the PC card detector 114. Therefore, the control program for the CPU may not be required, thereby quickly performing the operations.

Figure 9:
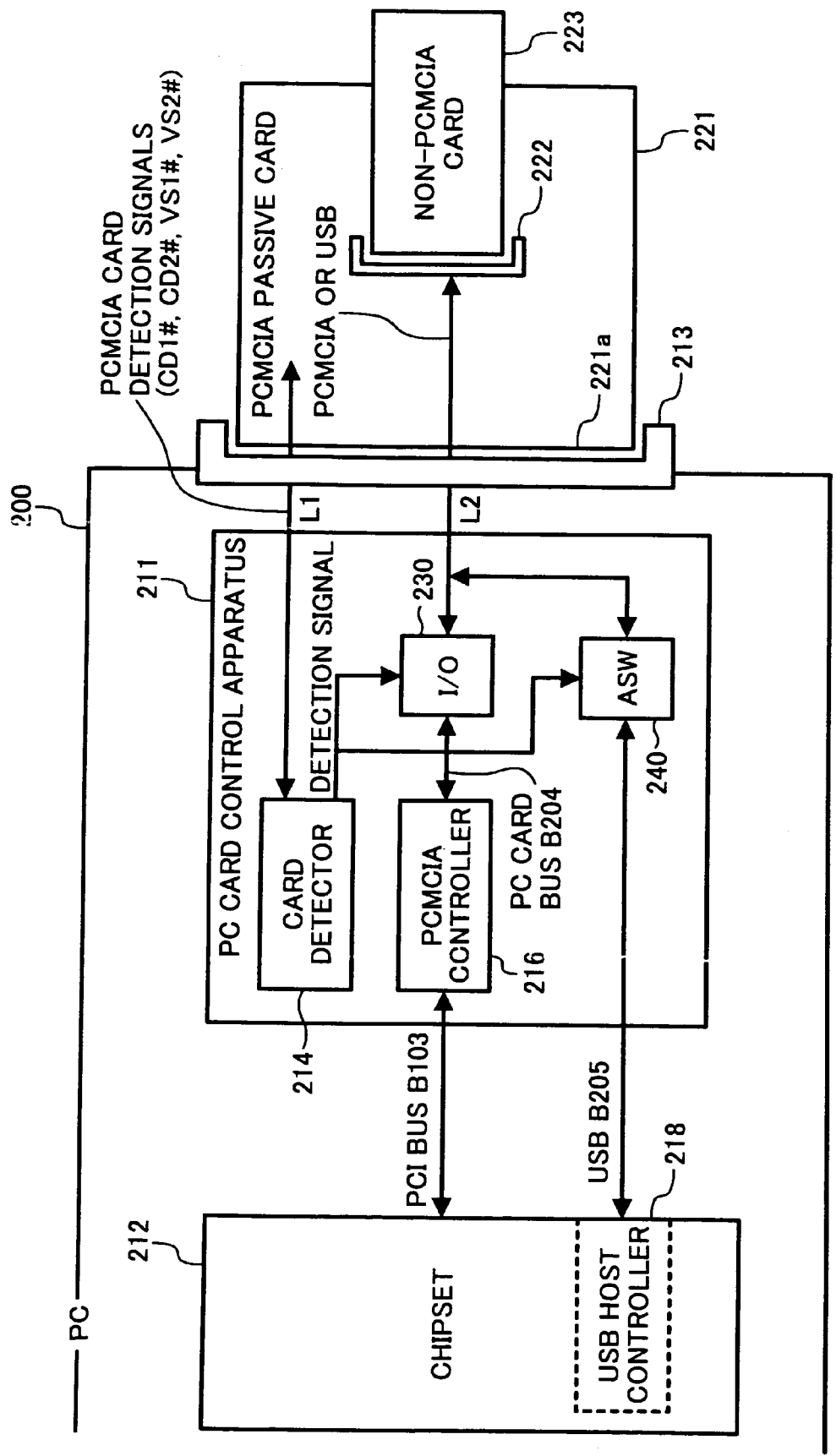
FIG. 9 is an illustration showing a structure of another computer system including a PC card control apparatus of another exemplary embodiment according to the present patent specification.
Figure 10A:
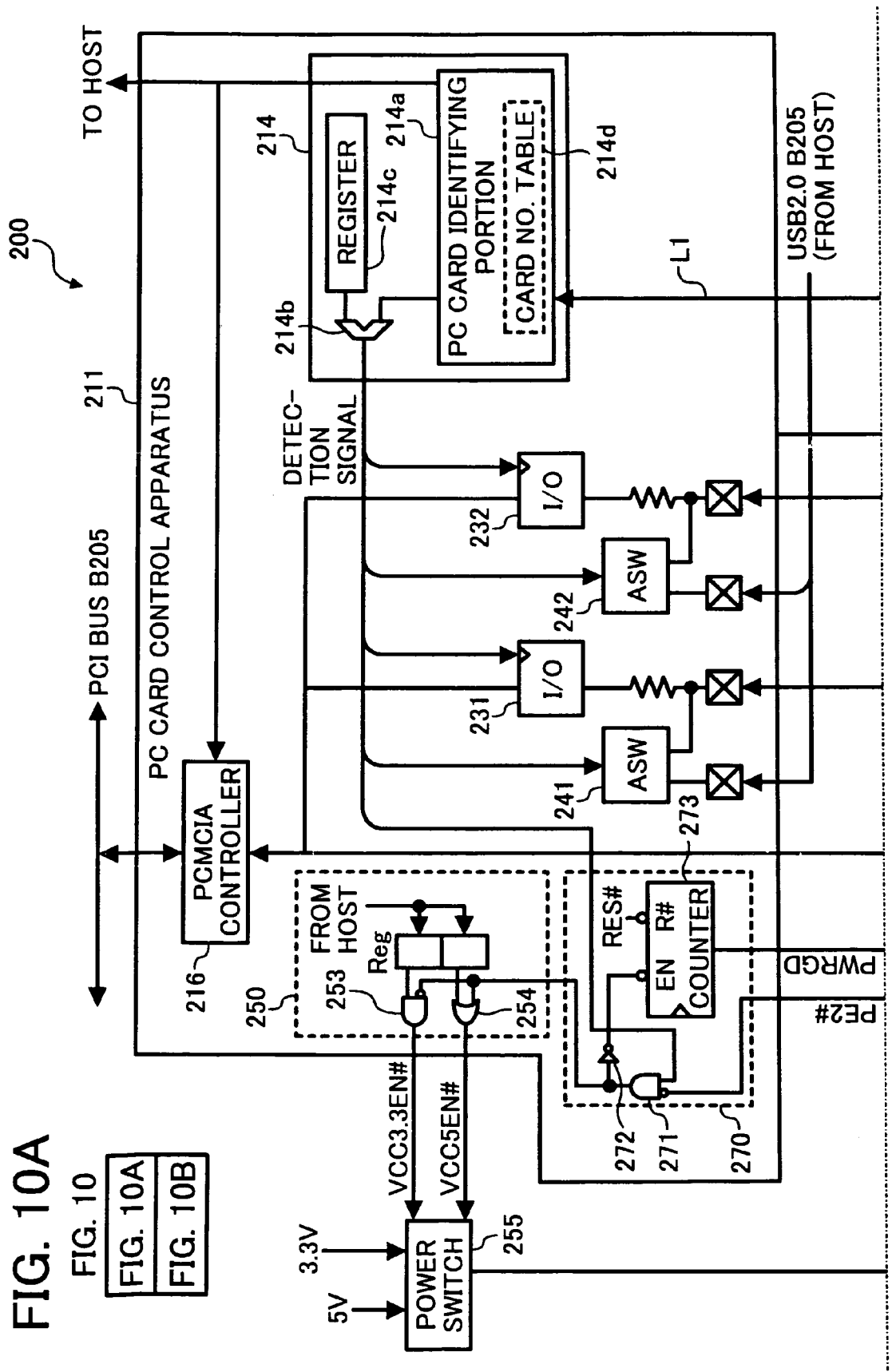
FIGS. 10A and 10B are illustrations of a detailed structure of the PC card control apparatus of FIG. 9 according to another exemplary embodiment of the present patent specification.
Figure 10B:
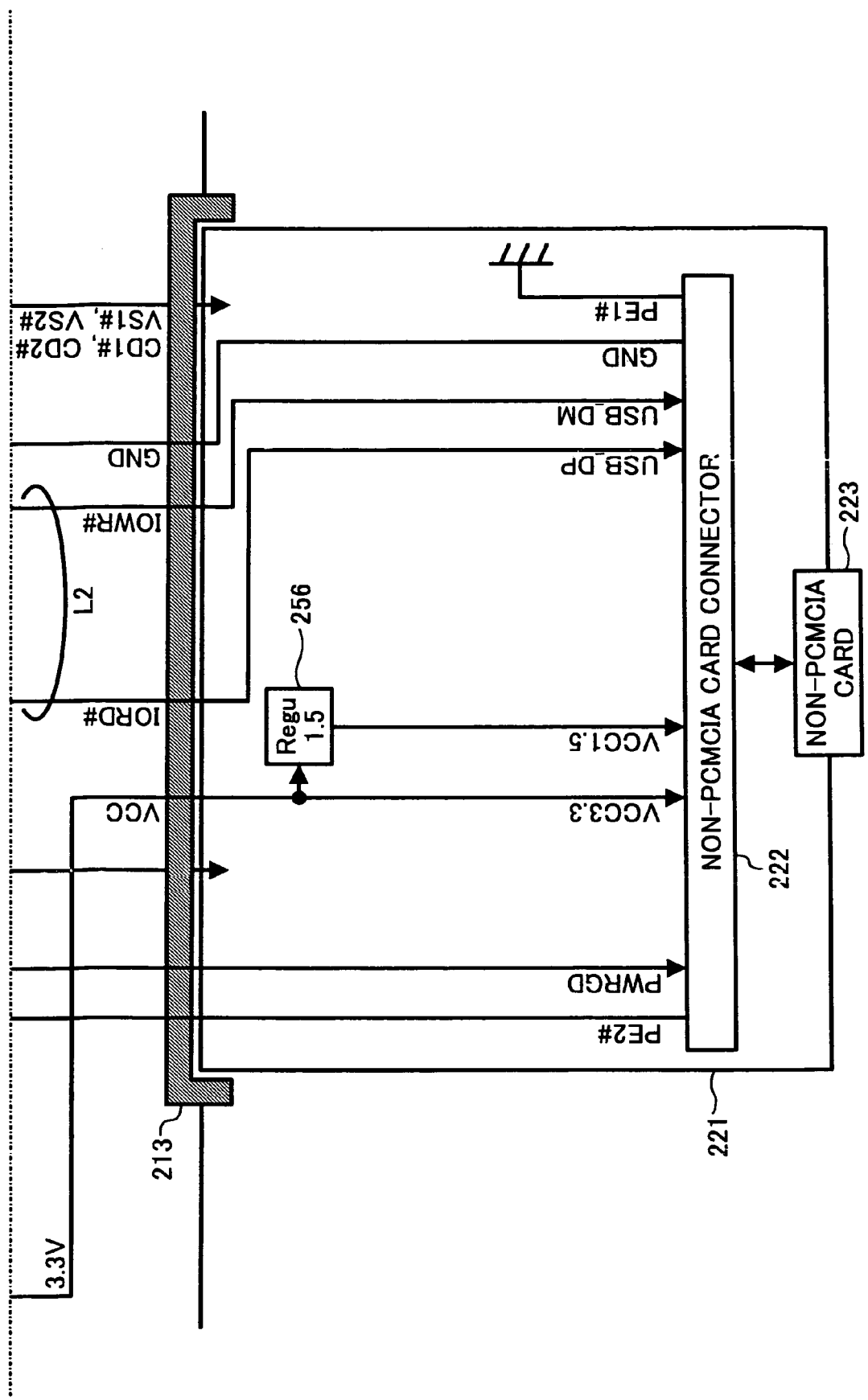

Referring to FIGS. 9 and 10, a structure of another computer system 200 is described according to another exemplary embodiment of the present patent specification.

In FIG. 9, the computer system 200 includes a PC card control apparatus 211 and a chipset 212. The structure of the computer system 200 shown in FIG. 9 are similar to that of the computer system 100 shown in FIG. 2, except for a third power switch 270 (see FIG. 10). Therefore, descriptions related to the identical structures will be omitted.

As shown in FIG. 10, the third power switch 270 is a switch replacing the second power switch 160 provided to the PCMCIA passive-card-adapting card 121 of FIG. 5. The third power switch 270 is provided to a PC card control apparatus 211 and includes a two-input AND gate 271, an inverter 272 and a counter 273.

The two-input AND gate 271 receives the inverted PE2# signal at one signal input terminal and the card detection signal at the other signal input terminal. An output terminal of the two-input AND gate 271 is connected to an enable terminal of the counter 273 via the inverter 272. The output data sent from the output terminal of the two-input AND gate 271 is transmitted to a signal input terminal of a two-input AND gate 253 of a power switching portion 250, and to a signal input terminal of a two-input OR gate 254 after the output data is inverted.

Referring now to FIG. 11, a card control operation performed by a PC card detector 214 of the PC card control apparatus 211 having the structure as shown in FIG. 10 and the CPU supported by a chipset 212 based on data sent from the PC card detector 214.

Since the CPU performs the same operation as it does in the card control operation shown in FIG. 8, FIG. 8 will be referred to when describing operations Steps S31 and S32 performed by the CPU. In Step S41 of FIG. 11, the PC card detector 214 determines whether a PCMCIA card or the PCMCIA passive-card-adapting card 212 is inserted in (or connected or attached to) a PCMCIA card connector 213 according to a change of potential of the card detection signals which are the CD1# signal and the CD2# signal. When it is determined neither a PCMCIA card nor a PCMCIA passive-card-adapting card 221 is inserted in Step S41 and when the determination result in Step S41 is NO, the process of Step S41 repeats until either a PCMCIA card or the PCMCIA passive-card-adapting card 221 is inserted. When it is determined either a PCMCIA card or the PCMCIA passive-card-adapting card 221 is inserted in Step S41 and when the determination result in Step S41 is YES, the procedure goes to Step S42. In Step S42, the PC card detector 214 determines whether the card connected to the PCMCIA card connector 213 is a PCMCIA card or the PCMCIA passive-card-adapting card 221. When the card is determined as the PCMCIA passive-card-adapting card 221 in Step S42 and when the determination result in Step S42 is YES, the procedure goes to Step S43. In Step S43, the PC card detector 214 determines whether a non-PCMCIA card 223 is connected to a non-PCMCIA card connector 222 of the PCMCIA passive-card-adapting card 221. When it is determined that the non-PCMCIA card 223 is connected to the non-PCMCIA card connector 222 of the PCMCIA passive-card-adapting card 221 in Step S43 and when the determination result in Step S43 is YES, the power supply control signals which are the Vcc3.3EN# signal and the Vcc5EN# signal for switching the power supply voltages are set, in Step S44, based on a card detection signal output from the PC card detector 214. After Step S44 is performed, the first power switch 255 is switched and the power supply voltages Vcc of approximately 3.3V and Vcc of approximately 1.5V are supplied to the PCMCIA card connector 213 in Step S45. After Step S45 is performed, the counter 273 embedded in the third power switch 270 is stopped. Then, in Step S46, the PC card detector sets the PWRGD signal to be output to the non-PCMCIA card 223. After the Step S46 is performed, the non-PCMCIA card 223 becomes operable in Step S47.

When the card is determined as a PCMCIA card in Step S42 and when the determination result in Step S42 is NO, the procedure goes to Step S48. In Step S48, the PC card detector 214 sets a predetermined flag therein. After Step S48 is performed, the PC card detector 214 requests an interruption to the CPU included in the chipset 212 as a host CPU in Step S49. After Step S49 is performed, the PC card detector 214 waits for a response of a result obtained through the operations performed by the CPU (See FIG. 8).

After that, in Step S50 of FIG. 11, the first power switch 255 is switched to supply the power supply voltages Vcc of approximately 3.3V and Vcc of approximately 1.5V. After Step S50 is performed, the PCMCIA card becomes operable in Step S51. Steps S48 through S51 as described above are the card control operations complying with the PCMCIA standard.

Referring to FIG. 12, a schematic structure of another computer system 300 is described according to another exemplary embodiment of the present patent specification.

The computer system 300 includes a PC card control apparatus 311 and a chipset 312. Structures of the computer system 300 shown in FIG. 12 are similar to those of the computer system 100 shown in FIG. 2, except for an analog switch 340 embedded in the computer system 300. The structure and function of the analog switch 340 is same as those of the analog switch 140 embedded in the PC card control apparatus 111.

Referring to FIG. 13, a schematic structure of another computer system 400 is described according to another exemplary embodiment of the present patent specification.

The computer system 400 includes a PC card control apparatus 411 and a chipset 412. Structures of the computer system 400 shown in FIG. 13 are similar to those of the computer system 100 shown in FIG. 2, except for a USB hub 458. The USB hub 480 replaces the analog switch 140 embedded in the PC card control apparatus 111 in FIG. 2 and performs a same operation as the analog switch 140. Since the USB hub 480 is easily purchasable, the PC card control apparatus 411 may be made at low cost.

Referring to FIG. 14, a schematic structure of another computer system 500 is described according to another exemplary embodiment of the present patent specification.

The computer system 500 includes a PC card control apparatus 511 and a chipset 512. Structures of the computer system 500 shown in FIG. 14 are similar to those of the computer system 100 shown in FIG. 2, except for a USB hub 580. The USB hub 580 is provided outside the PC card control apparatus 511 in the computer system 500. The structure and function of the USB hub 580 is same as those of the USB hub 158 embedded in the PC card control apparatus 111. The structure of the PC card control apparatus 511 is similar to that of the PC card control apparatus 11 included in the conventional computer system 10 of FIG. 1, except that the MUX 15 and the USB host controller 17 of the PC card control apparatus 11 are replaced by a set of I/O circuits 556 of the PC card control apparatus 511. Therefore, the computer system 500 may not require change to various circuits and may be produced at low cost.

The PC card control apparatuses 111, 211, 311, 411 and 511 in the above-described exemplary embodiments employ a USB for a non-PCMCIA card in the present patent specification. Instead of the USB, a new bus interface such as a PCIexpress bus may be used.

Further, in the above-described embodiments, the PC card control apparatuses controlling a PCMCIA card which complies with the PCMCIA standard are described. However, the PC card control apparatuses according to the present patent specification may be applied to a PC card which does not comply with the PCMCIA standard if the PC card control apparatus includes (i) a card detector which recognizes a non-PCMCIA card and outputs a predetermined detection signal and (ii) switches which switch buses and power supply circuits based on the output from the card detector.

Further, in the above-described embodiments, the non-PCMCIA card is described as PC cards having a size smaller than the PCMCIA card. As an alternative, the non-PCMCIA card may be a PC card having a same size as the PCMCIA card so that the non-PCMCIA card can directly be connected to the PC card connector of the PC card control apparatus without using the card-adapting card.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Applications No. 2003-094915 filed on Mar. 31, 2003, No. 2003-095000 filed on Mar. 31, 2003, No. 2003-095019 filed on Mar. 31, 2003, No. 2004-056362 filed on Mar. 1, 2004, No. 2004-056365 filed on Mar. 1, 2004 and No. 2004-056368 filed on Mar. 1, 2004, the entire contents of which are incorporated by reference herein.

The invention claimed is:

1. A mobile information terminal, comprising:
a host computer; and
a PC card control apparatus for controlling connections of PC cards with the host computer, the PC card control apparatus comprising:
a PC card connector configured to provide connections for connecting one of a first PC card compliant with a predetermined card standard and a card-adapting card for connecting a second PC card compliant with a different card standard to the PC card control apparatus,
said predetermined card standard requiring a first data format and said different card standard requiring a second data format different from said first data format;
a card detector configured to detect connection of the card-adapting card to the PC card control apparatus and to subsequently output a detection signal; and
an interconnection switching circuit configured to switch the connections of the PC card connector to connect the PC card connector to a bus interface of said host computer dedicated to communicate data in said second data format, upon receiving the detection signal from the card detector,
wherein said data is communicated between said bus interface of said host computer and the second PC card in said second data format of said different card standard without converting to said first data format of said predetermined card standard.

2. The mobile information terminal according to claim 1, wherein the predetermined card standard includes a PCMCIA standard.

3. The mobile information terminal according to claim 1, wherein the second PC card is compatible with one of a USB2.0 bus interface and a PCI express bus interface.

4. The mobile information terminal according to claim 1, wherein the interconnection switching circuit includes an analog switch.

5. The mobile information terminal according to claim 1, wherein the interconnection switching circuit includes a USB hub.

6. The mobile information terminal according to claim 1, further comprising a power supply voltage switching circuit configured to switch power supply voltages including first power supply voltage and a second power supply voltage both supplied to the PC card connector based on the detection signal.

7. The mobile information terminal according to claim 6, wherein the first power supply voltage is one of 1.5 volts and 3.3 volts and the second power supply voltage is 5 volts.

8. The mobile information terminal according to claim 6, wherein the power supply voltage switching circuit comprises:
a power switching portion configured to issue a power supply control signal based on the detection signal; and
a first power switch configured to output to the PC card connector the first power supply voltage indicated by the power supply control signal from the power switching portion.

9. The mobile information terminal according to claim 8, wherein the power switching portion of the power supply voltage switching circuit is mounted on the PC card control apparatus and the first power switch is provided outside the PC card control apparatus.

10. The mobile information terminal according to claim 8, Further comprising a second power switch configured to be activated upon insertion of the second PC card after receiving the first power supply voltage from the first power switch and to output in a predetermined time period a signal informing that the first power supply voltage is stable.

11. The mobile information terminal according to claim 1, wherein amongst components of the PC card control apparatus at least the card detector, the interconnection switching circuit, and the power switching portion are integrated into a one-chip IC.

* * * * *